Feb. 21, 1950      D. B. GARDINER      2,498,542
RELIEF VALVE FOR POWER TRANSMISSIONS
Filed March 20, 1944

INVENTOR.
DUNCAN B. GARDINER
BY
*Ralph L. Twesdale*
ATTORNEY

Patented Feb. 21, 1950

2,498,542

UNITED STATES PATENT OFFICE 2,498,542

RELIEF VALVE FOR POWER TRANSMISSIONS

Duncan B. Gardiner, Detroit, Mich., assignor to Vickers Incorporated, Detroit, Mich., a corporation of Michigan Application March 20, 1944, Serial No. 527,224

12 Claims. (Cl. 137—53)

This invention relates to power transmissions, particularly to those of the type comprising two or more fluid pressure energy translating devices, one of which may function as a pump and another as a fluid motor.

The invention is more particularly concerned with a pilot-controlled, pressure responsive valve particularly adapted for the purpose of controlling fluid pressure in a line in a hydraulic power transmission system.

A valve of this character is frequently used as a relief valve to prevent the building up of pressure beyond an undesired point or as a resistance valve in series in a line to produce a predetermined pressure drop in that line.

One valve construction which has been particularly successful for this type of duty utilizes a control piston for operating the main valve and provides a control chamber in restricted communication with the pressure space of the main valve. A pilot-controlled relief valve is in communication with the control chamber and opens at a predetermined pressure setting to permit discharge of fluid from the control space. Valves of this class, for example, such as that illustrated in the Vickers Patent No. 2,043,453, have been found well adapted to the high pressure service requirements of hydraulic power systems because of the absence of the heavy spring necessary in any directly-operated relief valve and because of their stable and accurate characteristics in holding pressure at a constant value at different discharge rates through the valve.

It is an object of the present invention to provide a pilot-controlled, pressure responsive valve of the class described having an improved construction with respect to compactness, light weight, reliability, and performance characteristics.

More specifically, it is an object of the invention to provide a valve of this character having a main body member provided with a simple, large, easily machined bore to receive a cartridge composed of a minimum of simple parts and comprising all of the necessary valve elements so as to eliminate the necessity of drilling control passages through the body parts.

Another object is to provide a valve of this character having a ball-type, pilot relief valve and means associated therewith for stabilizing its action when open to obtain a steadier regulation of pressure and to inhibit chattering action of the valve.

Another object is to provide a valve of the type described which is statically balanced with respect to pressure in the discharge space of the valve.

A further object is to provide such a valve wherein the arrangement of parts is such that the main valve seat as well as the pilot valve seat are situated adjacent the respective pressure and discharge spaces of the valve to reduce the number and length of interconnecting passages between the various parts of the valve.

It is also an object to provide a valve of this class having improved means of communication between the pressure space and the control chamber which will assure more accurate sampling of the pressure in the pressure space when the latter is subject to slight variations in different portions thereof due to high velocity flow conditions.

Another object of the present invention is to provide a valve which may, by the interchange of one relatively inexpensive part, be adapted for use as a sequence valve to provide a drain for discharge from the pilot valve separate from the normal discharge space of the main valve.

Further objects and advantages of the present invention will be apparent from the following description, reference being had to the accompanying drawing wherein a preferred form of the present invention is clearly shown.

Figure 1:
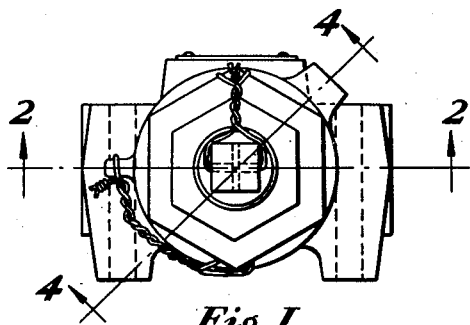
Figure 1 is a top view of a preferred embodiment of the present invention.

Referring now to the drawing, there is illustrated a valve comprising a main body 10 having a pressure space 12 and a discharge space 14. The pressure space is provided with diametrically opposite pressure ports 16 and 18, while the discharge space has similar discharge ports 20 and 22.

A typical hydraulic power transmission system is illustrated as comprising a tank 24 from which a fixed displacement pump 26 draws fluid and delivers it to the port 16. The port 18 is connected to the pressure port of a four-way, directional valve 28 which has its service ports connected to opposite sides of a fluid motor 30. The tank port of valve 28 is connected with port 22 of the valve body 10, while port 20 is connected to return spent fluid to the tank 24.

The body 10 is provided with a large main bore 32 having a shoulder 34 and extending between the spaces 12 and 14. The bore 32 also extends downwardly beyond the space 12 to provide a control chamber 36. It is preferred to have the bore 32 and the chamber 36 of the same diameter whereby they may be machined in the same operation to insure concentricity and alignment. Above the discharge space 14, the bore 32 is threaded at 38, and at its extreme upper end there is a smooth-walled enlargement 40.

Rigidly mounted within the bore 32 is an insert 42. The latter is provided with a plurality of radial projections 43 adapted to rest on the shoulder 34 at spaced points around the circumference thereof. The insert 42 is provided with a central longitudinal bore 44, the lower end of which constitutes a main valve seat 46. Mounted in the upper end of bore 44 is a member 48 having a pilot valve seat 50 at its upper end and provided with a small diameter jet passage 52 opening from bore 44. It will thus be seen that the members 42 and 48 provide by means of bores 44 and 52 a passage having the main valve seat 46 at one end and the pilot valve seat 50 at the other.

At an intermediate point between the seats, the bore 44 is provided with a counterbore 54 which is connected to the outer surface of the insert 42 by a plurality of drilled passages 56. These passages communicate with the outside of insert 42 at a point where its diameter is substantially less than that of the bore 32, thus providing a clearance space to form a passage connecting counterbore 54 with the discharge space 14.

The insert 42 and the member 48 are rigidly clamped in position in the body 10 by a plug 58 screwed into the thread 38 and abutting the top surface of the member 48. The plug 58 is provided with a plurality of milled slots 60 which prevent the plug 58 from blocking off the pilot valve seat 50 from the discharge space 14. Mounted on and normally closing the pilot valve seat 50 is a ball valve 62 which is pressed downwardly by an adjustable spring 64 resting upon a spring seat 66 and having its upper end received in a hollow adjusting screw 68. The latter is threaded in the plug 58 and is provided with a lock nut 70.

Slidably mounted in the bore 44 and resting on seat 46 is a main valve 72. The latter is provided at its lower end with an integral control piston 74 slidable in the control chamber 36. A light spring 76 normally urges the valve 72 into contact with seat 46. If desired, the main valve may be of the same diameter as the bore 44 and slide into the seat 46 when in closed position, although it is preferred to utilize a poppet construction such as that illustrated.

The valve 72 is provided with a central internal passage 78 which connects the control chamber 36 with the pilot valve seat 50. The control chamber is in restricted communication with the pressure space 12 through the medium of a series of equally spaced restriction holes 80. It is preferred to form these holes in the cylindrical portion of valve 72 which lies within the pressure space 12 so as to obtain a representative average sampling of the pressure in pressure space 12 under high velocity flow conditions.

The valve 72 is provided with a piston portion 82 at its upper end which acts as a guide within the bore 44 and also constitutes a balancing piston having an effective area equal to the effective area of the main valve, thus balancing out the effect of any pressure built up in the counterbore 54.

Suitable sealing rings 84, 86, 88 and 90 are provided to seal the various cylindrical joints in the valve.

Figure 4:
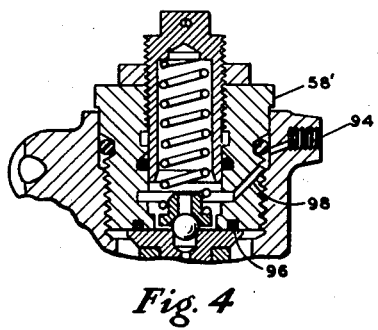
Figure 4 is a fragmentary cross section on line 4—4 of Figure 1 illustrating an adaptation of that valve to provide an external drain for the pilot relief valve.
Figure 2:
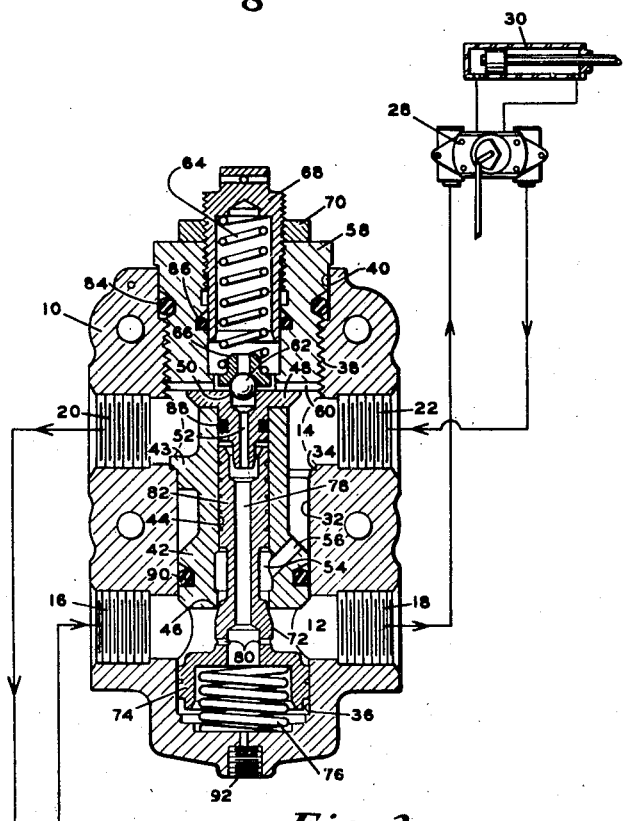
Figure 2 is a longitudinal, cross sectional view of the valve illustrated in Figure 1 showing in addition a schematic hydraulic power transmission circuit.
Figure 3:
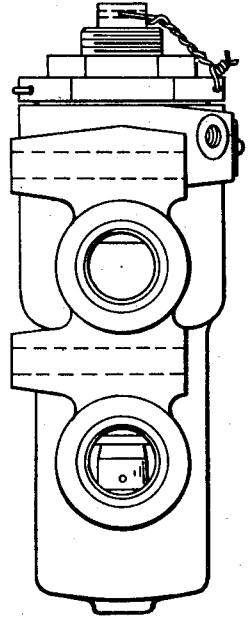
Figure 3 is a side view of the valve shown in Figure 1.

A threaded connection port 92 is provided at the bottom of the valve to communicate with the control chamber 36, while a similar threaded connection 94 is provided near the top of the body 10 to communicate with the bottom portion of the enlarged bore 40 (see Figure 4). This figure illustrates the use of a substitute threaded plug member 58' which is provided with a sealing ring 96 on its bottom surface resting on the member 48 and sealing the pilot valve seat 50 from the discharge space 14. An angular drilled passage 98 is provided in the plug member 58' to connect between the space above seat 50 and the lower portion of bore 40, thus providing an external drain for the pilot relief valve 62.

In operation, with the valve connected as shown and with the pressure in pressure space 12 at any value below the setting of pilot relief valve 62, valve 72 is urged to its seat by the spring 76. Under these conditions, pressure in the control chamber 36 is equal to that in pressure space 12 because there is no flow and no pressure drop through the resistance holes 80, and the control piston 74 is accordingly balanced as to the fluid pressure forces acting upon its opposite faces.

As soon as pressure in space 12 and chamber 36 rises above the setting of pilot valve 62, the latter will open causing fluid to discharge from control chamber 36 through the passage 78, jet 52 and valve 62 to the discharge space 14. When this flow increases in volume to the point where the pressure drop through restriction passages 80 is sufficient, the pressure in pressure space 12 will have risen to a point sufficient for the pressure differential on piston 74 to overcome spring 76, and the main valve 72 will open permitting fluid to discharge from pressure space 12 through seat 46, counterbore 54, passages 56 and bore 32 to the discharge space 14. When sufficient fluid has been discharged to relieve the pressure in space 12, valve 62 will close, thus causing pressure to build up in the control chamber 36 and close the valve 72.

It has been found that the provision of the jet 52 exerts a decided stabilizing influence upon the action of the valve as a whole, reducing fluctuations in pressure and minimizing chattering action under all conditions. It is preferred to make the jet 52 of a diameter no greater than half the diameter of the pilot valve seat 50 and to space it below the seat by a distance no greater than the diameter of the ball 62.

The threaded connection 92 may be used for the purpose of venting the control chamber by connecting it to a selectively operable manual valve which can instantly exhaust the same, thus suddenly reducing the pressure in the control chamber 36 to open the valve 72 at any time independently of the setting of pilot valve 62. When this feature is not used, the connection 92 may be plugged. Likewise, the connection 94 is plugged when the member 58 is used and is connected to a suitable exhaust line when the member 58' is used.

While the form of embodiment of the invention as herein disclosed constitutes a preferred form, it is to be understood that other forms might be adopted, all coming within the scope of the claims which follow.

What is claimed is as follows:

1. A pilot-controlled, pressure responsive valve comprising in combination a body member having a pressure space and a discharge space at a distance from the pressure space and formed with a valve bore interconnecting the spaces, a seat formed at the end of the bore adjacent the pressure space, means forming a control chamber in line with the bore adjacent the pressure space, a poppet valve slidable in the bore having a head normally resting on the seat and a control piston slidable in the chamber, means forming a passage through the valve extending from the control chamber to a point in the vicinity of the discharge space, the control chamber being in restricted communication with the pressure space, and a pressure responsive pilot valve normally closing the end of the passage.

2. A pilot-controlled, pressure responsive valve comprising in combination a body member having a pressure space and a discharge space at a distance from the pressure space and formed with a valve seat at the pressure space in communication with the discharge space, means forming a control chamber on the opposite side of the pressure space from the valve seat, a valve having a head normally closing off the seat and a control piston slidable in the control chamber, a pilot valve seat adjacent the discharge space and communicating with the control chamber, the control chamber being in restricted communication with the pressure space, and a pressure responsive pilot valve normally closing said pilot valve seat.

3. A pilot-controlled, pressure responsive valve comprising in combination a body member having a pressure space and a discharge space at a distance from the pressure space and formed with a valve bore interconnecting the spaces, a seat formed by the end of the bore adjacent the pressure space, means forming a control chamber in line with the bore, a poppet valve slidable in the bore and having a head normally resting on the seat and a balancing piston responsive to discharge pressure slidable in the bore and a control piston slidable in the chamber, means forming a passage extending from the control chamber to a point in the vicinity of the discharge space, the control chamber being in restricted communication with the pressure space, and a pressure responsive pilot valve normally closing the end of the passage.

4. A pilot-controlled, pressure responsive valve comprising in combination a body member having a pressure space and a discharge space and formed with a large bore interconnecting said spaces, an insert rigidly mounted in said bore and provided with a main passage, one end of which provides a main valve seat at the pressure space and the other end of which provides a pilot valve seat at the discharge space, means forming a branch passage connecting an intermediate point in the main passage with the discharge space, means forming a control chamber, a main valve normally closing the main valve seat and having a control piston slidable in the control chamber and a guide portion slidable in the main passage and blocking communication between the two valve seats, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve.

5. A pilot-controlled, pressure responsive valve comprising in combination a body member having a pressure space and a discharge space and formed with a large bore interconnecting said spaces, an insert rigidly mounted in said bore and provided with a main passage, one end of which provides a main valve seat at the pressure space and the other end of which provides a pilot valve seat at the discharge space, means forming a branch passage connecting an intermediate point in the main passage with the discharge space, means forming a control chamber, a main valve normally closing the main valve seat and having a control piston slidable in the control chamber and a guide portion slidable in the main passage and blocking communication between the two valve seats, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve, said insert being formed with the main passage centrally located and on the axis of the large bore in the body member and with the branch passage comprising a clearance space on the outside of the insert and lying within the large bore.

6. A pilot-controlled, pressure responsive valve comprising in combination a body member having a pressure space and a discharge space and formed with a main valve normally closing communication between said spaces, a control chamber formed in the body and having a control piston slidable therein and connected to operate the valve, the control chamber being in restricted communication with the pressure space, a pilot valve comprising a ball and seat normally closing the control chamber from the discharge space and responsive to a predetermined increase in pressure in the control chamber to open and discharge fluid from the control chamber to permit the main valve to open, and means forming a jet to cause fluid discharging from the control chamber to impinge upon the ball valve and stabilize its position while open.

7. A pilot-controlled, pressure responsive valve comprising in combination a body member having a pressure space and a discharge space and formed with a main valve normally closing communication between said spaces, a control chamber formed in the body and having a control piston slidable therein and connected to operate the valve, the control chamber being in restricted communication with the pressure space, a pilot valve comprising a ball and seat normally closing the control chamber from the discharge space and responsive to a predetermined increase in pressure in the control chamber to open and discharge fluid from the control chamber to permit the main valve to open, and means forming a jet to cause fluid discharging from the control chamber to impinge upon the ball valve and stabilize its position while open, the jet having its discharge point spaced from the ball by no more than the ball diameter.

8. A pilot-controlled, pressure responsive valve comprising in combination a body member having a pressure space and a discharge space and formed with a main valve normally closing communication between said spaces, a control chamber formed in the body and having a control piston slidable therein and connected to operate the valve, the control chamber being in restricted communication with the pressure space, a pilot valve comprising a ball and seat normally closing the control chamber from the discharge space and responsive to a predetermined increase in pressure in the control chamber to open and discharge fluid from the control chamber to permit the main valve to open, and means forming a jet to cause fluid discharging from the control chamber to impinge upon the ball valve and stabilize its position while open, the jet having a diameter no greater than one-half the diameter of the seat.

9. A pilot-controlled, pressure responsive valve comprising in combination a body member having a pressure space and a discharge space and formed with a large bore interconnecting said spaces, an insert rigidly mounted in said bore and provided with a main passage, one end of which provides a main valve seat at the pressure space and the other end of which provides a pilot valve seat at the discharge space, means forming a branch passage connecting an intermediate point in the main passage with the discharge space, means forming a control chamber, a main valve normally closing the main valve seat and having a control piston slidable in the control chamber and a balancing piston slidable in the main passage and blocking communication between the two valve seats, said balancing piston having an effective area substantially equal to the effective area of the main valve, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve.

10. A pilot-controlled, pressure responsive valve comprising in combination a body member having a pressure space and a discharge space and formed with a large bore interconnecting said spaces, an insert rigidly mounted in said bore and provided with a main passage, one end of which provides a main valve seat at the pressure space and the other end of which provides a pilot valve seat at the discharge space, means forming a branch passage, connecting an intermediate point in the main passage with the discharge space, a control chamber in the body formed by a continuation of the large bore beyond the pressure space, a main valve normally closing the main valve seat and having a control piston slidable in the control chamber and a guide portion slidable in the main passage and blocking communication between the two valve seats, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve.

11. A pilot-controlled, pressure responsive valve comprising in combination a body member having a pressure space and a discharge space and formed with a main passage interconnecting said spaces, one end of which passage provides a main valve seat at the pressure space and the other end of which provides a pilot valve seat at the discharge space, means forming a branch passage connecting an intermediate point in the main passage with the discharge space, means forming a control chamber, a main valve normally closing the main valve seat and having a control piston slidable in the control chamber and a guide portion slidable in the main passage and blocking communication between the two valve seats, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve.

12. A pilot-controlled, pressure responsive valve comprising in combination a body member having a pressure space and a discharge space and formed with a main passage interconnecting said spaces, one end of which passage provides a main valve seat at the pressure space and the other end of which provides a pilot valve seat at the discharge space, means forming a branch passage connecting an intermediate point in the main passage with the discharge space, means forming a control chamber, a main valve normally closing the main valve seat and having a control piston slidable in the control chamber and a balancing piston slidable in the main passage and blocking communication between the two valve seats, said balancing piston having an effective area substantially equal to the effective area of the main valve, means forming a passage through the main valve connecting the control chamber with the pilot valve seat, the control chamber being in restricted communication with the pressure space, and a pilot valve normally closing the pilot valve seat from the discharge space and responsive to a predetermined rise in pressure in the control chamber to permit discharge from the control chamber and consequent opening of the main valve.

DUNCAN B. GARDINER.

REFERENCES CITED

The following references are of record in the file of this patent:

UNITED STATES PATENTS

| Number | Name | Date |
| --- | --- | --- |
| 165,791 | Clemens | July 20, 1875 |
| 488,220 | Pollock | Dec. 20, 1892 |
| 534,514 | Mellin | Feb. 19, 1895 |
| 715,706 | Tippett | Dec. 9, 1902 |
| 781,913 | Schutte | Feb. 7, 1905 |
| 1,305,747 | Sechrist | June 3, 1919 |
| 2,320,763 | Trautman | June 1, 1943 |
| 2,351,841 | Seem | June 20, 1944 |
| 2,360,816 | Pasco | Oct. 17, 1944 |
| 2,366,596 | Clifton | Jan. 2, 1945 |

FOREIGN PATENTS

| Number | Country | Date |
| --- | --- | --- |
| 4,730 | Great Britain | Nov. 17, 1880 |